(12) United States Patent
Koifman

(10) Patent No.: US 12,279,055 B2
(45) Date of Patent: Apr. 15, 2025

(54) IMAGE SENSOR WITH STACKED PIXELS INCLUDING CHARGE SHARING GATES

(71) Applicant: Apple Inc., Cupertino, CA (US)

(72) Inventor: Vladimir Koifman, Rishon LeZion (IL)

(73) Assignee: Apple Inc., Cupertino, CA (US)

( * ) Notice: Subject to any disclaimer, the term of this patent is extended or adjusted under 35 U.S.C. 154(b) by 28 days.

(21) Appl. No.: 18/337,001

(22) Filed: Jun. 18, 2023

(65) Prior Publication Data

US 2024/0098379 A1   Mar. 21, 2024

Related U.S. Application Data

(60) Provisional application No. 63/407,672, filed on Sep. 18, 2022.

(51) Int. Cl.
*H04N 25/616* (2023.01)
*H04N 25/779* (2023.01)
(Continued)

(52) U.S. Cl.
CPC ......... *H04N 25/616* (2023.01); *H04N 25/779* (2023.01); *H04N 25/78* (2023.01); *H04N 25/79* (2023.01)

(58) Field of Classification Search
None
See application file for complete search history.

(56) References Cited

U.S. PATENT DOCUMENTS 5,144,442 A   9/1992  Ginossar et al.
6,570,617 B2  5/2003  Fossum et al.
(Continued)

FOREIGN PATENT DOCUMENTS

DE   102021209943 A1   3/2022
EP       2123019 B1    9/2019
(Continued)

OTHER PUBLICATIONS

Shukri, "Apple's Newest iPhone Three Camera System is "Campacked"," Image Sensors Technology, TechInsights Inc., pp. 1-10, year 2023.
(Continued)

*Primary Examiner* — Mark T Monk
(74) *Attorney, Agent, or Firm* — Meitar Patents Ltd.; Daniel Kligler

(57) ABSTRACT

An image sensor includes a logic die, including column readout circuits and bitlines connected to the column readout circuits. A sensor die is overlaid on the logic die. The image sensor includes an array of detector elements, each including a sensing circuit on the sensor die, which includes a photodiode, a floating diffusion node, a charge sharing transistor coupled between the photodiode and the floating diffusion node, a reset transistor coupled to the floating diffusion node, and a source follower transistor. In each detector element, a pixel circuit on the logic die includes a select transistor, which has an input coupled to the output of the source follower and an output coupled to one of the bitlines. Two current memory circuits are coupled to the input of the select transistor and are configured to sense and output respective signals indicative of levels of noise in the detector element.

20 Claims, 3 Drawing Sheets

(51) Int. Cl.
*H04N 25/78* (2023.01)
*H04N 25/79* (2023.01)

(56) References Cited

U.S. PATENT DOCUMENTS

| | | |
|---|---|---|
| 8,169,517 B2 | 5/2012 | Poonnen et al. |
| 8,606,009 B2 | 12/2013 | Sun |
| 9,344,635 B2 | 5/2016 | Vogelsang et al. |
| 9,571,774 B2 | 2/2017 | Koifman et al. |
| 10,250,832 B1 | 4/2019 | Xu et al. |
| 10,798,322 B2 | 10/2020 | Smith et al. |
| 10,859,434 B2 | 12/2020 | Panicacci |
| 11,336,860 B2 * | 5/2022 | Yonemoto .............. H04N 25/78 |
| 2014/0159702 A1 | 6/2014 | Doege |
| 2016/0240572 A1 | 8/2016 | Koifman et al. |
| 2016/0269661 A1 | 9/2016 | Hseih et al. |
| 2017/0118430 A1 | 4/2017 | Koifman et al. |
| 2018/0227516 A1 | 8/2018 | Mo et al. |
| 2018/0227523 A1 | 8/2018 | Mo et al. |
| 2020/0382726 A1 | 12/2020 | Inaoka et al. |
| 2023/0011827 A1 | 1/2023 | Cho et al. |

FOREIGN PATENT DOCUMENTS

| | | |
|---|---|---|
| KR | 20200098764 A | 8/2020 |
| WO | 2023018841 A9 | 2/2023 |

OTHER PUBLICATIONS

Spivak et al., "Wide-Dynamic-Range CMOS Imaging Devices-Comparative Performance Analysis", IEEE Transactions on Electron Devices, vol. 56, No. 11, pp. 2446-2461, Nov. 2009.
Wikipedia, "Internet of Things (IoT)" pp. 1-53, latest edit Apr. 18, 2023.
Robidoux et al., "End-to-end High Dynamic Range Camera Pipeline Optimization," Conference Paper, Conference on Computer Vision and Pattern Recognition (CVPR) 2021, pp. 1-11, year 2021.
Ernst et al., "HDR+ with Bracketing on PixelPhones," Blog, Google Research, pp. 1-8, Apr. 23, 2021, as downloaded from as downloaded from https://blog.research.google/2021/04/hdr-with-bracketing-on-pixel-phones.html.
Koifman, U.S. Appl. No. 18/322,629, filed May 24, 2023.
Koifman, U.S. Appl. No. 18/335,157, filed Jun. 15, 2023.
Panicacci et al., U.S. Appl. No. 18/353,085, filed Jul. 16, 2023.
Theuwissen, "Cmos Image Sensors: State-of-the-Art," Solid-State Electronics, vol. 52, pp. 1401-1406, year 2008.

* cited by examiner

IMAGE SENSOR WITH STACKED PIXELS INCLUDING CHARGE SHARING GATES

CROSS-REFERENCE TO RELATED APPLICATION

This application claims the benefit of U.S. Provisional Patent Application 63/407,672, filed Sep. 18, 2022, which is incorporated herein by reference.

FIELD OF THE INVENTION

The present invention relates generally to optoelectronic devices, and particularly to image sensors.

BACKGROUND AND SUMMARY

The large majority of image sensors currently in use are CMOS (complementary metal-oxide-semiconductor) active-pixel sensor (APS) monolithic arrays, with 4T pixels. In these devices, each detector element (referred to as a "pixel") comprises a photodiode, a floating diffusion node, and four CMOS transistors, including a transfer gate, reset gate, selection gate, and source-follower readout transistor. The transfer gate controls charge transfer from the photodiode to the floating diffusion and enables noise reduction by correlated double sampling (CDS).

SUMMARY

Embodiments of the present invention that are described hereinbelow provide improved image sensors and methods for producing and controlling such image sensors.

There is therefore provided, in accordance with an embodiment of the invention, an image sensor, which includes a logic die, including column readout circuits and bitlines connected to the column readout circuits, a sensor die, overlaid on the logic die, and an array of detector elements. Each detector element includes a sensing circuit, which is disposed on the sensor die, and a pixel circuit, which is disposed on the logic die. The sensing circuit includes a photodiode having cathode and anode terminals, a floating diffusion node, a charge sharing transistor coupled between one of the terminals of the photodiode and the floating diffusion node, a reset transistor coupled between the floating diffusion node and a reset voltage, and a source follower transistor having an input connected to the floating diffusion node and an output. The pixel circuit includes a select transistor, which has an input coupled to the output of the source follower, and an output coupled to one of the bitlines, and first and second current memory circuits, which are coupled to the input of the select transistor and are configured to sense and output respective signals indicative of levels of noise in the detector element.

In a disclosed embodiment, the image sensor includes a lateral overflow integration capacitor (LOFIC) circuit, including one or more charge storage capacitors and one or more LOFIC transistors coupled between the floating diffusion node and the charge storage capacitors, wherein the reset transistor is coupled between the floating diffusion node and the reset voltage.

In some embodiments, each of the first and second current memory circuits includes at least one sampling capacitor and a bias transistor, which is switched on to sample a noise current into the at least one sampling capacitor. In a disclosed embodiment, each of the first and second current memory circuits includes at least one sampling transistor, coupled between the input of the select transistor and the at least one sampling capacitor, wherein the at least one sampling transistor is switched on following the reset transistor to sample the noise current into the at least one sampling capacitor.

In some embodiments, the pixel circuit includes a shared sampling circuit, which is coupled between the first and second current memory circuits and the input of the select transistor. In one embodiment, the shared sampling circuit includes a read transistor connected between the input of the select transistor and a sampling line, which is connected to both of the first and second current memory circuits, and a bias transistor having a polarity opposite to the read transistor and connected in parallel with the read transistor between the input of the select transistor and the sampling line.

Typically, during each image frame, the first and second current memory circuits are activated in alternation to sample different noise currents and to output signals indicative of the noise currents. In some embodiments, the first current memory circuit is activated while the charge sharing transistor is turned on to sample a first noise current during a first sampling period, and the second current memory circuit is activated while the charge sharing transistor is turned off to sample a second noise current during a second sampling period. In a disclosed embodiment, the select transistor is turned off during the first and second sampling periods, and after the first and second sampling periods, the reset transistor is turned on and off to reset the floating diffusion node, and the second current memory circuit is activated while the select transistor is turned on and the charge sharing transistor is turned off to output a noise signal to the bitline.

Additionally or alternatively, each image frame includes an exposure period, during which photocharge accumulates on the photodiode, wherein following the exposure period, the charge sharing transistor and the select transistor are turned on, and the first current memory circuit is activated to read out a noise-compensated light signal to the bitline.

In a disclosed embodiment, the image sensor includes a correlated double sampling (CDS) circuit, which is coupled to the bitlines and is configured to apply the respective signals output by the first and second current memory circuits in compensating for noise in light signals output by the photodiode.

There is also provided, in accordance with an embodiment of the invention, a method for image sensing, which includes providing a logic die, including column readout circuits and bitlines connected to the column readout circuits, overlaying on the logic die a sensor die, and forming an array of detector elements on the sensor die and the logic die. Each detector element includes a sensing circuit, which is disposed on the sensor die, and a pixel circuit, which is disposed on the logic die. The sensing circuit includes a photodiode having cathode and anode terminals, a floating diffusion node, a charge sharing transistor coupled between one of the terminals of the photodiode and the floating diffusion node, a reset transistor coupled between the floating diffusion node and a reset voltage, and a source follower transistor having an input connected to the floating diffusion node and an output. The pixel circuit includes a select transistor, which has an input coupled to the output of the source follower, and an output coupled to one of the bitlines, and first and second current memory circuits, which are coupled to the input of the select transistor and are configured to sense and output respective signals indicative of levels of noise in the detector element.

The present invention will be more fully understood from the following detailed description of the embodiments thereof, taken together with the drawings in which:

DETAILED DESCRIPTION OF EMBODIMENTS

Embodiments of the present invention that are described herein provide image sensors comprising 4T pixels of a novel design that achieves higher dynamic range with lower noise than conventional 4T pixel arrays. The image sensor comprises a sensor die stacked on a logic die. Each pixel in the image sensor comprises a sensing circuit on the sensor die, including a charge sharing gate, which controls the transfer of charge from the photodiode to the floating diffusion node. In addition, each pixel comprises a pixel circuit on the logic die, which includes dual current memory circuits. The two current memory circuits are used together with the charge sharing gate in sensing the levels of signal and noise in the detector element. Signals output by the current memory circuits enable precise measurement and suppression of thermal (kTC) noise using CDS.

In some embodiments, the sensing circuit also comprises a lateral overflow integration capacitor (LOFIC) circuit, which enables sensing over a wide range of lighting conditions, from indoors to bright sunlight, without automatic exposure control. In alternative embodiments, however, the current memory circuits on the logic die can be used to reduce noise even without a LOFIC circuit.

Figure 1:
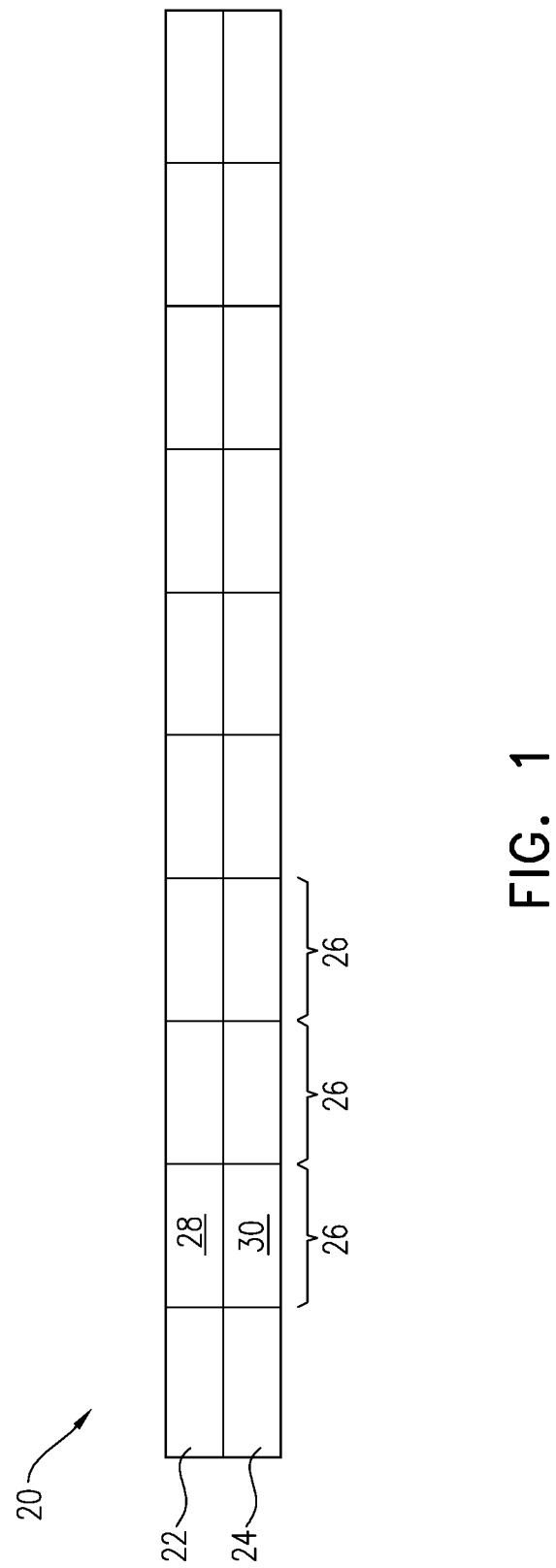
FIG. 1 is a schematic side view of an image sensor, in accordance with an embodiment of the invention.
Figure 2:
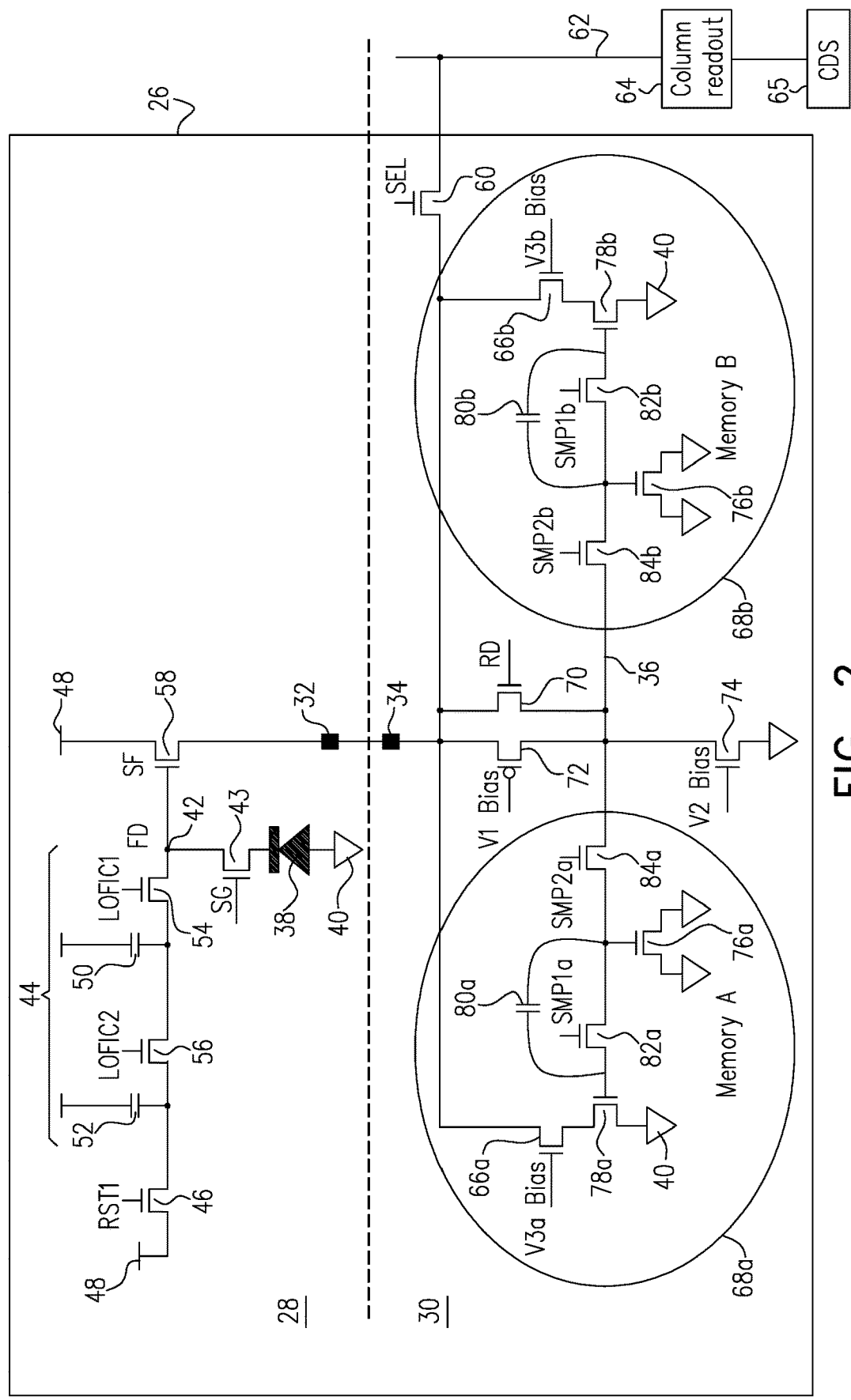
FIG. 2 is a schematic circuit diagram showing details of a detector element in an image sensor, in accordance with an embodiment of the invention.

FIG. 1 is a schematic side view of an image sensor 20, in accordance with an embodiment of the invention. Image sensor 20 comprises a logic die 24, made from a first silicon wafer, and a sensor die 22, made from a second silicon wafer, overlaid on logic die 24. Image sensor 20 comprises an array of detector elements 26, also referred to as pixels, each comprising a sensing circuit 28 on sensor die 22 and a pixel circuit 30 on logic die 24. Pixel circuits 30 are connected by bitlines to column readout circuits (as shown in FIG. 2). The stacked wafer configuration of image sensor 20 makes it possible to use standard CMOS control and readout circuits in logic die 24, while sensing circuits 28 may be fabricated by a different process. Alternatively, sensor die 22 may comprise another semiconductor material, rather than silicon.

FIG. 2 is a schematic circuit diagram showing details of one of detector elements 26, in accordance with an embodiment of the invention. Sensing circuit 28 is shown in FIG. 2 as comprising N-channel MOSFET transistors and an N-on-P photodiode 38. Alternatively, sensing circuit 28 may comprise P-channel transistors and P-on-N photodiodes. The components of sensing circuit 28 are connected to a supply voltage 48, for example 1.5 V, 1.2 V, or 1.0 V. There is no need in this design for boosting voltages above the supply voltage or below the ground potential.

Sensing circuit 28 comprises a floating diffusion node (FD) 42 connected via a charge sharing transistor (SG) 43 to one of the terminals of photodiode 38 (in this case to the cathode, with the anode connected to a ground 40). A lateral overflow integration capacitor (LOFIC) circuit 44 is coupled to floating diffusion node 42, and a reset transistor (RST1) 46 is coupled between the LOFIC circuit and a reset voltage (which is taken to be supply voltage 48 in the pictured example).

LOFIC circuit 44 in the present example comprises two charge storage capacitors 50, 52 and two LOFIC transistors (LOFIC1 and LOFIC2) 54, 56 coupled in series to floating diffusion node 42. The first LOFIC transistor (LOFIC1) 54 connects the floating diffusion node to the charge input terminal of the first charge storage capacitor 50, which has a small capacitance, for example about 20 fF. The second LOFIC transistor 56 connects the charge input terminal of this first charge storage capacitor 50 to the charge input terminal of the second charge storage capacitor 52, which has a larger capacitance, for example about 500 fF. In this configuration, floating diffusion node 42 itself will be used to store and read out photocharge in low-light conditions; charge storage capacitor 50 will be used to store and read out photocharge in intermediate conditions; and charge storage capacitor 52 will be used to store and read out photocharge in conditions of bright light. This LOFIC configuration enables detector element 26 to sense light over a dynamic range of about 120 dB. Alternatively, other LOFIC configurations may be used, with smaller or larger numbers of capacitors and transistors.

A source follower transistor (SF) 58 has its gate connected to receive a charge input from floating diffusion node 42 and its drain connected to an output terminal 32, which is bonded to an input terminal 34 of pixel circuit 30. Input terminal 34 is connected to the input of a select transistor (SEL) 60. When the select transistor is turned on, it outputs a signal from detector element 26 to a bitline 62, which serves a column of the array of detector elements. As noted above this bitline connects the detector elements in sensor die 22 to a column readout circuit 64 in logic die 24. Bitline 62 operates at a source line voltage (VSL) supplied by readout circuit 64, for example 1.5 V. The signals output from detector element 26 are conveyed via bitline 62 to a CDS circuit 65 on logic die 24.

Each image frame of image sensor 20 includes an exposure period, for example in the range of 1-10 ms, during which photocharge from photodiode 38 is collected via charge sharing transistor (SG) 43 at floating diffusion node 42. Photocharge may also be collected on one or both of LOFIC charge storage capacitors 54, 56, depending on the intensity of the incident light. Prior to the exposure period, reset transistor (RST1) 46 is switched on to reset floating diffusion node 42. LOFIC transistors 54, 56 are also switched on together with reset transistor 46 to reset LOFIC charge storage capacitors 50, 52.

For purposes of noise sensing and cancellation, pixel circuit 30 comprises a pair of current memory circuits 68a, 68b, labeled Memory A and Memory B in FIG. 2. Both memory circuits 68a and 68b sample the current at the input to select transistor 60 via a shared sampling circuit, which includes an N-channel read transistor (RD) 70 in parallel with a P-channel bias transistor (V1 Bias) 72. The read transistor and bias transistor in this example have opposite polarities. Thus, in the pictured example, read transistor 70 (and the other components of pixel circuit 30) is an N-channel device, while V1 Bias transistor 72 is a P-channel device. A second bias transistor (V2 Bias) 74 is connected in series with the P-channel bias transistor and draws a bias current, for example about 100 nA, when the two bias transistors are switched on.

The two current memory circuits 68a and 68b sample the current at the input to select transistor 60 in alternation at different stages of the reset and readout process, as described below with reference to FIG. 3. To activate this sampling by a given current memory circuit, a respective bias transistor 66a or 66b (V3a Bias or V3b Bias) connected to input terminal 34 is closed, typically drawing a current of about 1 μA.

A sampling line 36 is connected to the drains of read transistor 70 and V1 Bias transistor 72 and the source of V2 Bias transistor 74. The current flowing from detector element 26 into each or memory circuits 68a and 68b is sampled by a respective pair of sampling capacitors 76a/78a or 76b/78b, which are connected between sampling line 36 and ground 40. These sampling capacitors 76a, 76b, 78a, 78b can have a low capacitance, for example about 4 fF each, with additional parasitic coupling 80a or 80b between the two sampling capacitors on the order of 0.1 fF.

To sample the current flowing from sensing circuit 28 during the reset period of sensing circuit 28, a pair of sampling transistors (transistors 82a and 84a in memory circuit 68a or transistors 82b and 82b in memory circuit 68n, labeled SMP1a, SMP2a, SMP1b and SMP2b) are briefly turned on together in the active current memory circuit. Transistor 82a or 82b is then turned off, followed by turning off transistor 84a or 84b. Transistors 82a and 82b sample the thermal (kTC) noise, while transistors 84a and 84b sample the residual error after transistor 82a or 82b is turned off. Thus, the kTC noise is sampled and compensated for by the current flowing to and from sampling capacitors 78a and 78b. The sampled current signals are then read out to bitline 62 by select transistor 60, as described below.

Further details of the operation and timing of current memory circuits 68a, 68b in pixel circuit 30, as well as of the operation of LOFIC circuit 44 in sensing circuit 28, are described in U.S. patent application Ser. No. 18/335,157, filed Jun. 15, 2023, whose disclosure is incorporated herein by reference. Alternatively, current memory circuits 68a, 68b may each comprise only a single sampling capacitor or a larger number of sampling capacitors, with one or more sampling transistors arranged accordingly.

Figure 3:
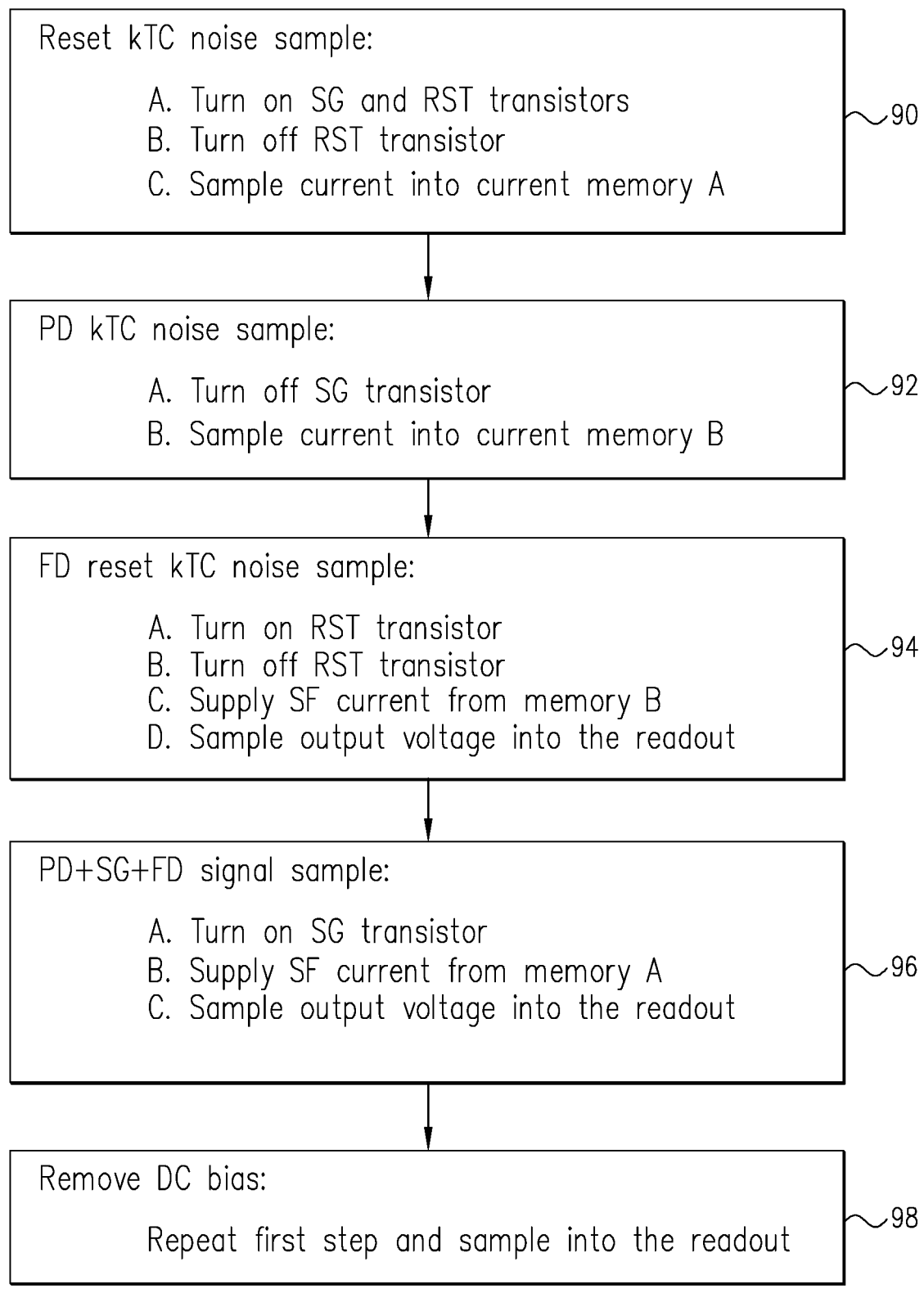
FIG. 3 is a flow chart that schematically shows a mode of operation of the detector element of FIG. 2, in accordance with an embodiment of the invention.

FIG. 3 is a flow chart that schematically illustrates a method for readout and noise cancellation of detector element 26, in accordance with an embodiment of the invention. The operation of LOFIC circuit 44 is omitted from this description for the sake of simplicity.

The method comprises five stages, including two stages carried out during the reset period, while select transistor (SEL) 60 is turned off, followed by three stages carried out during the readout period, during which select transistor 60 is turned on to read signals out to bitline 62. The reset and readout stages of the method can be carried out independently, and the entire sampling process can thus be pipelined for efficient execution. Although the stages are shown in a certain order in FIG. 3, different orders of the stages are possible and are considered to be within the scope of the present invention. The signals output in the readout stages are conveyed via bitline 62 to CDS circuit 65 on logic die 24, which applies the signals in computing and canceling out all the sources of noise in detector element 26 to generate an output signal that is substantially noise-free, as described below.

During an initial reset kTC noise sampling stage 90 in this process of FIG. 3, pixel circuit 30 samples the kTC noise associated with reset of detector element 26 into current memory circuit 68a (Memory A). For this purpose, charge sharing transistor (SG) 43 and reset transistor (RST1) 46 are turned on, and the reset transistor is then turned off. Transistors 70 and 72 in the shared sampling circuit are turned on, together with V3a bias transistor 66a, to sample the resulting current into Memory A. The sampled current in Memory A reflects the kTC noise voltage $V_n = Q_n/(C_{pd}+C_{sg}+C_{fd})$, wherein $Q_n$ is the accumulated charge on photodiode 38, charge sharing transistor 43, and floating diffusion node 42, while $C_{pd}$, $C_{sg}$, and $C_{fd}$ are the respective capacitances of these elements of sensing circuit 28.

Next, during a photodiode kTC noise sampling stage 92, pixel circuit 30 samples the kTC noise on photodiode 38 into current memory circuit 68b (Memory B). For this purpose, charge sharing transistor 43 is closed, with the result that the accumulated noise charge $Q_n$ is split randomly into a component $Q_{pd\_rst}$ on photodiode 38 and a complementary component $Q_{fd\_rst}$ on floating diffusion node 42. Transistors 70 and 72 in the shared sampling circuit are turned on, together with V3b bias transistor 66b, to sample the resulting current into Memory B. The sampled current in Memory B reflects the kTC noise voltage $V_{fd} = Q_{fd\_rst}/C_{fd}$.

An FD reset kTC noise sampling stage 94 comes next, at the beginning of the readout period, to sample the kTC noise on floating diffusion node (FD) 42 due to reset of detector element 26. In this stage, reset transistor (RST1) 46 is turned on and then turned off, while charge sharing transistor (SG) 43 remains off. V3b bias transistor 66b is turned on to serve as the current source for source follower transistor (SF) 58, via Memory B. Select transistor (SEL) 60 is turned on to sample the resulting noise voltage $V_{n1}$ from the input of the select transistor to bitline 62, wherein $V_{n1}=(Q_{fd\_rst}-Q_{fd\_rd})/C_{fd}$, and $Q_{fd\_rd}$ is the charge read out from floating diffusion node 42.

Next, during a signal sampling stage 96, a noise-compensated light signal, due to photocharge accumulated by photodiode 38 during the exposure period, is read out by select transistor (SEL) 60 to bitline 62. Charge sharing transistor (SG) 43 is turned on, causing the accumulated noise charge $Q_n$ again to be split randomly into a component $Q_{pd\_rst}$ on photodiode 38 and a complementary component $Q_{fd\_rd}$ on floating diffusion node 42. V3a bias transistor 66a is turned on to serve as the current source for source follower transistor (SF) 58, via Memory A. Select transistor (SEL) 60 is turned on to sample the resulting signal voltage V2 from the input of select transistor 60 to bitline 62, wherein $V_2=(Q_{pd\_rst}+Q_{fd\_rd}+Q_{sig})(C_{pd}+C_{sg}+C_{fd})$, and $Q_{sig}$ is the photocharge accumulated during the exposure period.

The noise-free signal can be derived by CDS circuit 65 from the difference between the readout signals $V_{n1}$ and $V_2$:

$$V_{sig}=V_2-V_{n1}*C_{fd}/(C_{pd}+C_{sg}+C_{fd})$$

This noise-free signal may still contain a DC bias, which is measured and subtracted out in a DC bias removal stage 98. In this stage, charge sharing gate (SG) 43 and reset transistor (RST1) 46 are again turned on, and reset transistor 46 is then turned off, as in stage 90, as described above. In stage 98, however, the resulting voltage is sampled via select transistor (SEL) 60 to bitline 62, giving a DC level that can then be subtracted from $V_{sig}$.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An image sensor, comprising:
   a logic die, comprising column readout circuits and bitlines connected to the column readout circuits;
   a sensor die, overlaid on the logic die; and
   an array of detector elements, each detector element comprising:
      a sensing circuit, which is disposed on the sensor die and comprises:
         a photodiode having cathode and anode terminals;
         a floating diffusion node;
         a charge sharing transistor coupled between one of the terminals of the photodiode and the floating diffusion node;
         a reset transistor coupled between the floating diffusion node and a reset voltage; and
         a source follower transistor having an input connected to the floating diffusion node and an output; and
      a pixel circuit, which is disposed on the logic die and comprises:
         a select transistor, which has an input coupled to the output of the source follower, and an output coupled to one of the bitlines; and
         first and second current memory circuits, which are coupled to the input of the select transistor and are configured to sense and output respective signals indicative of levels of noise in the detector element.

2. The image sensor according to claim 1, and comprising a lateral overflow integration capacitor (LOFIC) circuit, comprising one or more charge storage capacitors and one or more LOFIC transistors coupled between the floating diffusion node and the charge storage capacitors, wherein the reset transistor is coupled between the floating diffusion node and the reset voltage.

3. The image sensor according to claim 1, wherein each of the first and second current memory circuits comprises:
   at least one sampling capacitor; and
   a bias transistor, which is switched on to sample a noise current into the at least one sampling capacitor.

4. The image sensor according to claim 3, wherein each of the first and second current memory circuits comprises at least one sampling transistor, coupled between the input of the select transistor and the at least one sampling capacitor, wherein the at least one sampling transistor is switched on following the reset transistor to sample the noise current into the at least one sampling capacitor.

5. The image sensor according to claim 1, wherein the pixel circuit comprises a shared sampling circuit, which is coupled between the first and second current memory circuits and the input of the select transistor.

6. The image sensor according to claim 5, wherein the shared sampling circuit comprises:
   a read transistor connected between the input of the select transistor and a sampling line, which is connected to both of the first and second current memory circuits; and
   a bias transistor having a polarity opposite to the read transistor and connected in parallel with the read transistor between the input of the select transistor and the sampling line.

7. The image sensor according to claim 1, wherein during each image frame, the first and second current memory circuits are activated in alternation to sample different noise currents and to output signals indicative of the noise currents.

8. The image sensor according to claim 7, wherein the first current memory circuit is activated while the charge sharing transistor is turned on to sample a first noise current during a first sampling period, and the second current memory circuit is activated while the charge sharing transistor is turned off to sample a second noise current during a second sampling period.

9. The image sensor according to claim 8, wherein the select transistor is turned off during the first and second sampling periods, and wherein after the first and second sampling periods, the reset transistor is turned on and off to reset the floating diffusion node, and the second current memory circuit is activated while the select transistor is turned on and the charge sharing transistor is turned off to output a noise signal to the bitline.

10. The image sensor according to claim 8, wherein each image frame comprises an exposure period, during which photocharge accumulates on the photodiode, and wherein following the exposure period, the charge sharing transistor and the select transistor are turned on, and the first current memory circuit is activated to read out a noise-compensated light signal to the bitline.

11. The image sensor according to claim 1, and comprising a correlated double sampling (CDS) circuit, which is coupled to the bitlines and is configured to apply the respective signals output by the first and second current memory circuits in compensating for noise in light signals output by the photodiode.

12. A method for image sensing, comprising:
   providing a logic die, comprising column readout circuits and bitlines connected to the column readout circuits;
   overlaying on the logic die a sensor die; and
   forming an array of detector elements on the sensor die and the logic die, each detector element comprising:
      a sensing circuit, which is disposed on the sensor die and comprises:
         a photodiode having cathode and anode terminals;
         a floating diffusion node;
         a charge sharing transistor coupled between one of the terminals of the photodiode and the floating diffusion node;
         a reset transistor coupled between the floating diffusion node and a reset voltage; and
         a source follower transistor having an input connected to the floating diffusion node and an output; and
      a pixel circuit, which is disposed on the logic die and comprises:
         a select transistor, which has an input coupled to the output of the source follower, and an output coupled to one of the bitlines; and
         first and second current memory circuits, which are coupled to the input of the select transistor and are configured to sense and output respective signals indicative of levels of noise in the detector element.

13. The method according to claim 12, and comprising coupling a lateral overflow integration capacitor (LOFIC) circuit between the floating diffusion node and the reset transistor in each sensing circuit, the LOFIC circuit comprising one or more charge storage capacitors and one or more LOFIC transistors coupled between the floating diffusion node and the charge storage capacitors, wherein the reset transistor is coupled between the LOFIC circuit and the reset voltage.

14. The method according to claim 12, wherein each of the first and second current memory circuits comprises at least one sampling capacitor and a bias transistor, wherein the method comprises switching on the bias transistor to sample a noise current into the at least one sampling capacitor.

15. The method according to claim 14, wherein each of the first and second current memory circuits comprises at least one sampling transistor, coupled between the input of the select transistor and the at least one sampling capacitor, and wherein the method comprises switching on the at least one sampling transistor following the reset transistor to sample the noise current into the at least one sampling capacitor.

16. The method according to claim 12, wherein the pixel circuit comprises a shared sampling circuit, which is coupled between the first and second current memory circuits and the input of the select transistor.

17. The method according to claim 12, wherein the method comprises, during each image frame, activating the first and second current memory circuits in alternation to sample different noise currents and to output signals indicative of the noise currents.

18. The method according to claim 17, wherein activating the first and second current memory circuits comprises activating the first current memory circuit while the charge sharing transistor is turned on to sample a first noise current during a first sampling period, and activating the second current memory circuit while the charge sharing transistor is turned off to sample a second noise current during a second sampling period.

19. The method according to claim 18, wherein each image frame comprises an exposure period, during which photocharge accumulates on the photodiode, and wherein the method comprises, following the exposure period, turning on the charge sharing transistor and the select transistor, and activating the first current memory circuit to read out a noise-compensated light signal to the bitline.

20. The method according to claim 12, and comprising applying correlated double sampling (CDS) to the respective signals output by the first and second current memory circuits to compensate for noise in light signals output by the photodiode.

* * * * *